United States Patent
Musale et al.

(10) Patent No.: US 7,662,289 B2
(45) Date of Patent: *Feb. 16, 2010

(54) METHOD OF CLEANING FOULED OR SCALED MEMBRANES

(75) Inventors: Deepak A. Musale, Aurora, IL (US); E. H. Kelle Zeiher, Naperville, IL (US)

(73) Assignee: Nalco Company, Naperville, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 11/623,552

(22) Filed: Jan. 16, 2007

(65) Prior Publication Data

US 2008/0169006 A1 Jul. 17, 2008

(51) Int. Cl.
B01D 65/02 (2006.01)

(52) U.S. Cl. .............. 210/636; 134/22.19; 210/639; 210/652; 210/698; 210/701; 210/732; 210/733; 210/774

(58) Field of Classification Search .......... 134/22.12, 134/30, 22.14, 22.19; 210/636, 638, 639, 210/649, 650, 651, 698–701, 732, 733, 774; 137/2

See application file for complete search history.

(56) References Cited

U.S. PATENT DOCUMENTS 4,895,658 A * 1/1990 Amjad ................ 510/162
6,615,855 B2 * 9/2003 Lopez et al. ............ 137/2
6,641,754 B2 11/2003 Buentello et al.
6,852,819 B2 2/2005 Ohnishi et al.
2005/0184008 A1 * 8/2005 Schacht et al. .......... 210/636

FOREIGN PATENT DOCUMENTS

| GB | 2124199 | * | 2/1984 |
| JP | 2002346560 | | 3/2002 |
| WO | WO 02/079106 | | 10/2002 |
| WO | WO 2003/057351 | * | 7/2003 |
| WO | WO 2007/143448 | * | 12/2007 |

OTHER PUBLICATIONS

Bunseki Kagaku Abstracts, vol. 52, No. 4, Apr. 2003, Tohru Saitoh, Chiyo Matsubara and Masataka Hiraide, The Japan Society for Analytical Chemistry, pp. 1 and 7.*

* cited by examiner

Primary Examiner—Joseph W Drodge
(74) Attorney, Agent, or Firm—Peter A. DiMattia; Michael B. Martin (57) ABSTRACT

A method of cleaning a fouled or a scaled RO or NF membrane surface with a solution containing one or more thermoresponsive polymers is disclosed. More specifically, the method comprises: treating the membrane surface in a membrane separation system with a solution containing one or more TRP, wherein said TRP is soluble in said solution and at least an effective amount of said TRP diffuses into a foulant layer on said membrane surface; making insoluble said TRP diffused into said foulant layer; optionally, rinsing the membrane.

30 Claims, 5 Drawing Sheets

METHOD OF CLEANING FOULED OR SCALED MEMBRANES

FIELD OF THE INVENTION

This invention pertains to a method of cleaning fouled or scaled reverse osmosis (RO) and nanofiltration (NF) membranes using thermoresponsive polymers.

BACKGROUND

Membrane separation, which uses a selective membrane, is an increasingly common method of processing of liquid streams, such as in water purification. In membrane separation, constituents of the influent typically pass through the membrane as a result of a driving force(s) in one effluent stream called permeate thus leaving behind some portion of the original constituents in a second stream called concentrate or reject. Membrane separations commonly used for water purification or other liquid processing include the pressure driven processes of microfiltration (MF), ultrafiltration (UF), nanofiltration (NF), and reverse osmosis (RO). The performance of membrane separation, such as efficiency (e.g. flux, membrane permeability, permeate recovery, permeate quality, energy efficiency, time between membrane cleanings or time to conduct a cleaning cycle) and effectiveness (e.g. rejection or selectivity) are typically reduced by membrane fouling.

Membrane separation processes are prone to fouling by microbes, i.e. biofouling, particularly in aqueous streams, which provide optimum conditions for microbial growth. Biofouling is particularly detrimental to membrane separation systems because once it is started, the growth rate accelerates and biofouling can facilitate other types of fouling. For example, the extra-cellular polymeric substances ("EPS") or slime layer of the biomass can trap and hold scales and other particulates that might otherwise pass out of the membrane separation system during operation. Furthermore, a thick EPS layer can also decrease turbulent flow within the membrane. This can lead to an increase in the concentration polarization layer, which is a known contributor to membrane scaling phenomena.

A review article written by H. F. Ridgway & H. Flemming entitled "Membrane Biofouling in Water Treatment Membrane Processes", McGraw Hill, pp. 6.1 to 6.62, 1996, discusses many aspects of membrane fouling.

In general, biofouling is controlled through the use of biocides and other biocontrol agents, and by periodic cleaning of membrane elements/systems to remove the biofouling and associated debris.

Membrane fouling (colloidal, organic, bio, or a combination thereof) and scaling, can adversely impact the membrane performance. For example, it can decrease the permeate flow at a given driving force, lower the permeate quality (purity), and increase energy consumed to maintain a given permeate flow. This can necessitate the cleaning of the membrane separation system in order to remove the deposits.

Membrane fouling occurs in systems that treat water, wastewater, or industrial process streams.

Membrane cleaning processes usually consist of removing the membrane system from service, rinsing the membrane system with high quality water, preparing a cleaning solution, heating the cleaning solution, circulating the cleaning solution at low pressure through the membranes and back into the clean-in-place (CIP) tank. The process may also include alternating periods of circulating the cleaning solution through the system and soaking the system in the cleaning solution. The system may also be rinsed and fresh cleaning solution applied as needed. Finally the system is rinsed with permeate quality water and either subjected to a second cleaning or placed back in service.

Improved cleaning methods and products are needed because they can enhance the performance of the membrane separation process. Examples of such optimized performance include longer times between membrane cleanings, longer membrane life, and decreased energy costs due to better control of scaling, fouling, and other system parameters.

SUMMARY OF THE INVENTION

The present disclosure provides for method of cleaning a fouled or a scaled RO or NF membrane surface in a membrane separation system comprising: treating the membrane surface in a membrane separation system with a solution containing one or more TRP, wherein said TRP is soluble in said solution and at least an effective amount of said TRP diffuses into a foulant layer on said membrane surface; making insoluble said TRP diffused into said foulant layer; and optionally, rinsing the membrane.

DETAILED DESCRIPTION OF THE INVENTION

Definitions of Terms:

"Thermoresponsive polymer" or "TRP" means a polymer that undergoes phase transition at a certain temperature called LCST. A more detailed description of TRP's can be found in U.S. Pat. No. 6,852,819, which is herein incorporated by reference.

"MM" means million.

"LCST" means lower critical solution temperature

"NF" means nanofiltration.

"RO" means reverse osmosis.

"LMH" means liters per square meters per hour

"Soluble" means completely soluble or maximum swelling in solution below LCST of TRP.

PREFERRED EMBODIMENTS

Treating the membrane with a TRP solution can occur via various mechanisms. Circulating a TRP containing solution in a membrane separation system or soaking a membrane in a membrane separation system are two approaches to facilitating the transfer of TRP into a membrane.

In one embodiment, the membrane is treated with a solution containing TRP by circulating said solution in said membrane separation system.

In another embodiment, the membrane is treated with a solution containing TRP by soaking said membrane separation system with said solution.

The LCST of said TRP solution may be adjusted by adding solvents, hydrotropes, salts, surfactants or combination thereof to the pure TRP solution, prior to treating the membrane surface.

Figure 1:
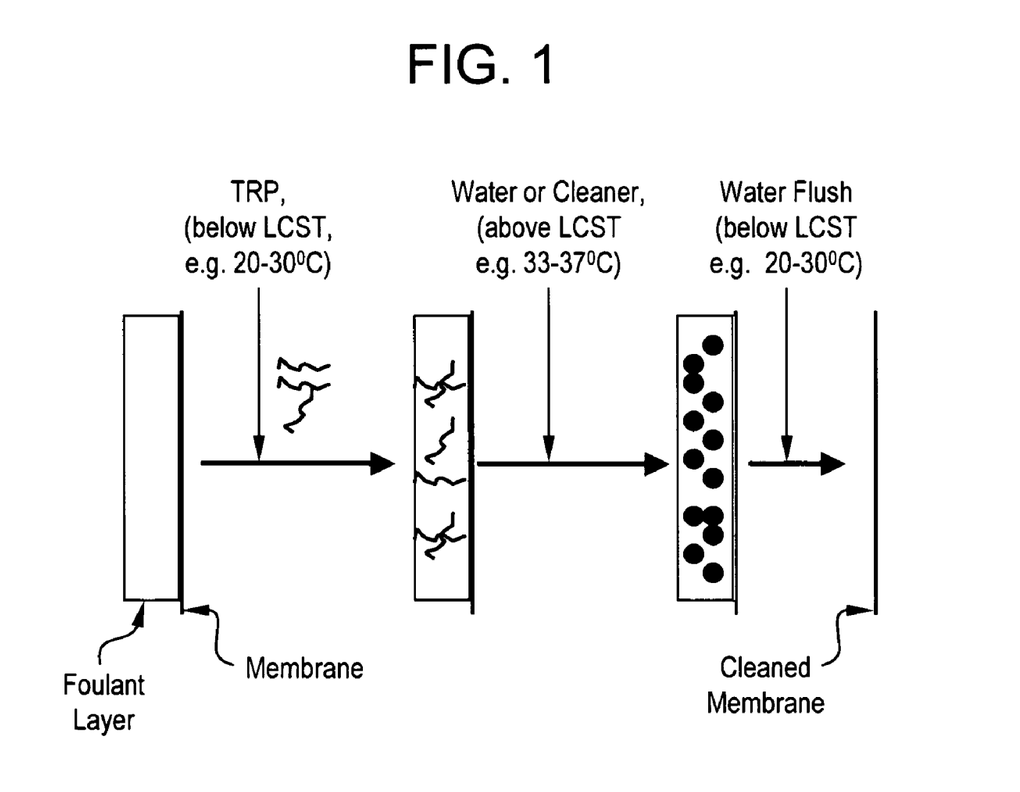
FIG. 1 shows a general schematic of how thermoresponsive polymers facilitate the removal of foulant that is located on a membrane surface.

FIG. 1 shows a general schematic of how thermoresponsive polymers facilitate the removal of foulant that is located on a membrane surface. The membrane is first treated with TRP at a temperature below LCST, which makes it soluble in solution. The TRP, a portion or all of it, then diffuses into the foulant layer. The TRP is then made insoluble by adding a solution, e.g. containing water or cleaner, under conditions so that the solution temperature is above LCST. When the TRP becomes insoluble the foulant layer is broken up or becomes structurally loose. Subsequently, the membrane may be rinsed so that residual TRP and foulant is removed from the membrane. The rinsing step may occur by flushing the membrane under conditions below LCST.

Making the diffused TRP insoluble or soluble in solution occur by altering the temperature of the solution.

In one embodiment, the TRP is made insoluble by raising the temperature of said solution above the LCST of said TRP.

In another embodiment, the TRP is made insoluble by adding a subsequent solution that is above the LCST of said TRP.

Rinsing the membrane surface can occur via various routes known to those of ordinary skill in the art.

In one embodiment, the membrane is rinsed with a solution that contains water. In a further embodiment, the solution temperature is below the LCST of said TRP.

There are many different routes for cleaning RO and NF membrane separation systems.

In one embodiment, the membrane is treated with a solution containing TRP by circulating said solution in said membrane separation system.

In another embodiment, the membrane is treated with a solution containing TRP by soaking said membrane separation system with said solution.

In another embodiment, the TRP is made insoluble by raising the temperature of said solution above the LCST of said TRP. In a further embodiment, a cleaner is added to said solution.

In another embodiment, the TRP is made insoluble by adding a subsequent solution that is at a temperature above the LCST of said TRP. In a further embodiment, the subsequent solution contains a cleaner.

In another embodiment, the membrane is rinsed with solution that contains water. In a further embodiment, the solution is at a temperature below the LCST of said TRP.

The solution temperature may be altered via several different routes. In one embodiment, a solution is circulated with the requisite temperature to alter the solubility of the thermoresponsive polymer. In another embodiment, a solution that is soaking the membrane may be heated by an external source.

Various types of TRP's are effective in facilitating the cleaning of RO and UF containing membranes.

In one embodiment, the TRP is poly(N-isopropyl acrylamide). Poly(N-isopropyl acrylamide) is a well known thermo-responsive polymer (TRP), which undergoes a phase transition at 32-33° C., i.e. it is soluble below this temperature and as this temperature approaches, polymer chains collapse and subsequently above this temperature, they aggregate and become insoluble.

In another embodiment, when the membrane is treated with a poly(N-isopropyl acrylamide) containing solution, the solution is at 25-30° C.

In another embodiment, the TRP is a homopolymer of a monomer having a formula $-CH_2=CR_1-CONR_2R_3$, wherein $R_1=H$ or $C_1-C_4$ alkyl group and $R_2$ and $R_3=H$, $C_1-C_{18}$ linear, branched or cyclic alkyl group, or their conjugates with proteins or enzymes, wherein $R_2$ and $R_3$ can not be both H In another embodiment, the TRP is a co-polymer of one or more co-monomers having the formula $-C_1H_2=CR_1-CONR_2R_3$, wherein $R_1=H$ or $C_1-C_4$ alkyl group and $R_2$ and $R_3=H$, $C_1-C_{18}$ linear, branched or cyclic alkyl group or fluorescent moiety such as pyrenyl, fluorenyl, naphthyl or dansyl or a combination thereof, or their conjugates with proteins or enzymes, wherein $R_2$ and $R_3$ can not be both H.

In another embodiment, the TRP is a co-polymer of one or more monomers having the formula $-CH_2=CR_1-CONR_2R_3$, where $R_1=H$ or $C_1-C_4$ alkyl group and $R_2$ and $R_3=H$, $C_1-C_{18}$ linear, branched or cyclic alkyl group and wherein $R_2$ and $R_3$ can not be both H, with one or more co-monomers selected from vinyl pyrrolidone, acrylic acid (AA), methacrylic acid (MAA), itaconic acid, styrene sulfonic acid, vinyl sulfonic acid, isopropenyl phosphonic acid, vinyl phosphonic acid, vinylidene diphosphonic acid, hydroxyethyl methacrylate (HEMA), dimethylaminoethyl acrylate (DMAEA), dimethylaminoethylmethacrylate (DMAEM), glycidyl acrylate, glycidyl methacrylate, acrylylglycinamide, N-acryloylsuccinimide (NASI), 2-acrylamido 2-methylpropane sulfonic acid (AMPS), N,N-dimethyl-N-acryloyloxyethyl-N-(3-sulfopropyl)-ammonium betaine, N, N-dimethyl-N-acrylamidopropyl-N-(2-carboxymethyl)-ammonium betaine, N,N-dimethyl-N-acrylamidopropyl-N-(3-sulfopropyl)-ammonium betaine, N,N-dimethyl-N-methacrylamidopropyl-N-(3-sulfopropyl)-ammonium betaine (DMMAPSB), N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl)dimethylammonio] ethyl 2-methyl phosphate, 2-(acryloyloxyethyl)-2'-(trimethylammonium)ethyl phosphate, [(2-acryloylethyl) dimethylammonio]methyl phosphonic acid, 2-methacryloyloxyethyl phosphorylcholine (MPC), 2-[(3-acrylamidopropyl)dimethylammonio]ethyl 2'-isopropyl phosphate (AAPI), 1-vinyl-3-(3-sulfopropyl)imidazolium hydroxide, (2-acryloxyethyl)carboxymethyl methylsulfonium chloride, 1-(3-sulfopropyl)-2-vinylpyridinium betaine, N-(4-sulfobutyl)-N-methyl-N,N-diallylamine ammonium betaine (MDABS), N,N-diallyl-N-methyl-N-(2-sulfoethyl) ammonium betaine, and a combination thereof.

In another embodiment, the TRP is selected from the group consisting of: polyethylene oxide (PEO), polypropylene glycol (PPG), poly[N-(2,2-dimethoxyethyl)-N-methylacrylamide], ethylene oxide (EO)-Propylene Oxide (PO) copolymer, polyvinylmethyl ether (PVME), poly(2-ethyl oxazoline) (PEOX), Hydroxypropyl cellulose (HPC), ethyl hydroxyethyl cellulose (EHEC), vinylalcohol-vinyl acetate copolymer, Poly(vinyl pyrrolidone), and a combination thereof.

The amount of TRP to be added to the system depends upon the chemical and physical nature of the foulant layer, extent of fouling on the membrane that is being cleaned, location of TRP injection before membrane system, a combination of these factors, or other factors, which would be apparent to one of ordinary skill the art. In one embodiment, an effective amount of TRP is from about 1 ppm to about 5000 ppm, based upon active solids in the solution.

The molecular weight of the TRP may range from about 1,000 to about 20 MM daltons, preferably from about 1000 to about 100,000 daltons.

The treatment of a membrane with the TRP containing solution occurs for about 10 minutes to about 8 hours, preferably for about 10 minutes to about 120 minutes.

The methodology in the present disclosure may be applied to RO and NF membrane systems.

In one embodiment, the membrane is polymeric.

In another embodiment, the membrane is inorganic.

In another embodiment, the membrane is selected from asymmetric or composite membranes.

In another embodiment, the membrane has hollow fiber configuration.

In another embodiment, the membrane has a flat sheet configuration.

In another embodiment, the membrane has a spiral wound configuration.

In another embodiment, the membrane has a tubular configuration.

The cleaning process may be applied to various types of RO membranes.

In one embodiment, the reverse osmosis membrane has NaCl rejection of 95-99.9%.

The cleaning process may be applied to various types of NF membranes.

In one embodiment, the nanofiltration membrane has NaCl rejection of 10-95% and $MgSO_4$ rejection of 10-99%.

One or more different types of cleaners may be added to the solution.

In one embodiment, the solution containing TRP contains a cleaner.

In another embodiment, a cleaner is added to the solution containing TRP.

In another embodiment, the membrane is treated with a solution containing cleaner.

The cleaner used to treat the membrane surface may be of various different types. The solution may contain for e.g. water, surfactants, acids or bases, chelants, enzymes, stabilizers, solvents or a combination thereof.

The cleaner may include water, cleaner, TRP, or a combination thereof.

The solution may be e.g. acidic, alkaline, or neutral. The solution may also contain buffering agents to maintain the solution in the desired pH range.

An acidic cleaning solution may contain hydrochloric acid, nitric acid, citric acid, phosphoric acid, oxalic acid, sulphuric acid or combination thereof.

An alkaline cleaning solution may contain sodium hydroxide, potassium hydroxide, calcium hydroxide, ammonium hydroxide or combination thereof.

Neutral solutions may contain surfactants and buffering agents.

In one embodiment, the cleaner contains chlorine dioxide, chlorous acid, chloramines, sodium hypochlorite, bromine, bromous acid, sodium bromate, an oxyhalogen compound, or a combination thereof.

In another embodiment, the cleaner contains hydrogen peroxide, peracetic acid, sodium percarbonate, or a combination thereof.

In another embodiment, the cleaner contains anionic surfactants, non-ionic surfactants, cationic surfactants, zwitterionic surfactants, or a combination thereof.

In another embodiment, anionic surfactants are selected from the group consisting of: aliphatic organic phosphate esters; linear and branched alkylaryl sulfonates and derivatives thereof; linear and branched alkylaryl ether sulfonates and derivatives thereof; alpha olefin sulfonate; ammonium alcohol ethoxylate sulfate; ammonium alkyl ether sulfates; ammonium alkyl sulfates; alkyl sulfates; alkoxylated alkyl alcohols; alcohol amine alkyl sulfates; alkyl sulfosuccinate salts; alkyl sulfonates and salts thereof; alkyl ether sulfonates and salts thereof; fatty alcohol ether sulfates; sulfates of alcohol; sulfonates of petroleum and petroleum derivatives; sulfonated oils and fatty acids; and a combination thereof.

In another embodiment, nonionic surfactants are selected from the group consisting of: alkanolamides; alkanol amide alkoxylates; alkoxylated alkyl amines; alkoxylated alcohols; alkyl glucosides; alkyl phenol alkoxylates; alkyl phenol alkoxylated alcohols; alkylated fatty acids; alkoxylated fatty alcohols; linear fatty alcohols, especially C16-C18; alkoxylated alkylphenols; alkoxylated triglycerides; alkoxylated fatty acids; fatty acid amines; alkoxylated fatty esters and oils; polyol esters; polyoxyalkylene esters of fatty acids; alkyl polysaccharide ethers; aliphatic ethers; polyether glycols; sorbitan derivatives; block copolymers of propylene oxide and ethylene oxide; and a combination thereof.

In another embodiment, zwitterionic surfactants are selected from the group consisting of: alkyl ammonium carboxylates, alkyl ammonium sulphates, alkylammonium sulfonates, alkyl amine oxides, alkyl betaines, alkyl sulfobetaines, and a combination thereof.

In another embodiment, cationic surfactants are selected from the group consisting of: single or mixed alkyl substituted ammonium chlorides, single or mixed alkyl substituted ammonium acetates, single or mixed alkenyl substituted ammonium chlorides and acetates, mixed alkyl hydroxyalkyl amidoalkyl substituted ammonium chlorides and acetates, single and mixed alkyl imidazolium salts, and a combination thereof.

In another embodiment, the cleaner contains chelants and/or sequestering agents.

In another embodiment, the cleaner contains enzymes. In a further embodiment, one or more enzymes are selected from the group consisting of lipases; proteases; pectinases, cellulases, gluconases, galactosidases, amylases;

The treatment of a membrane surface with a cleaner can occur via one or more routes. There are various approaches to membrane cleaning with one or more chemicals known to those of ordinary skill in the art and those approaches may be applied in the present methodology.

In one embodiment, a cleaner may be applied to a membrane in a membrane separation process by circulating a solution containing a cleaner through the membrane separation system, by soaking the membrane in a membrane separation system with a solution containing a cleaner, and by a combination thereof.

How long a membrane surface is exposed to a solution containing a cleaner depends upon various factors known to those of ordinary skill in the art of cleaning membranes. Factors such as the physical and chemical makeup of the membrane being cleaned as well as the type of foulants, if known, may utilized in the analysis for determining how long to expose a membrane to a cleaner solution.

In one embodiment, the treatment of a membrane with the solution containing a cleaner occurs for about 10 minutes to about 8 hours.

In another embodiment, the treatment of a membrane with the solution containing a cleaner occurs for about 10 minutes to about 120 minutes.

In another embodiment, when TRP is poly(N-isopropyl acrylamide), the temperature of said solution at which TRP is made insoluble is 33-50° C.

EXAMPLES

Example 1

A spiral wound polyamide reverse osmosis membrane element that was mainly bio-fouled in a water treatment application, was cut open to obtain a test coupon (0.0138 m² area). The cleaning performance was determined with the following test sequence. Test conditions for measurement of NaCl solution flux (permeate flow per unit time per unit membrane area) before and after cleaning were: 150 psi feed pressure, 1 Lit/min cross-flow rate, 2000 ppm NaCl in deionized water and 25° C. NaCl rejection was determined from feed and permeate conductivity measurements. TRP was poly(N-isopropyl acrylamide). Permeate flow was measured by a flow meter. A bucket and stopwatch could also be used.

The following steps were employed: (1) Baseline performance with 2000 ppm NaCl solution for 4 hrs to get flux and rejection value with fouled membrane before cleaning; (2) Alternate circulation (10 mm, 1 Lit/mm cross-flow rate) and soaking (10 mm) of TRP solution in DI water for 1 hr at 20° C. and 25-35 psi feed pressure; (3) Alternate circulation (10 mm, 1 Lit/mm cross-flow rate) and soaking (10 mm) of DI water (15 mm) or 4% alkaline cleaner (1 hr) at 35-37° C. and 25-35 psi feed pressure; and (4) Flush with DI water at 20° C. and repeat step 1 to get the post cleaning performance.

Figure 2:
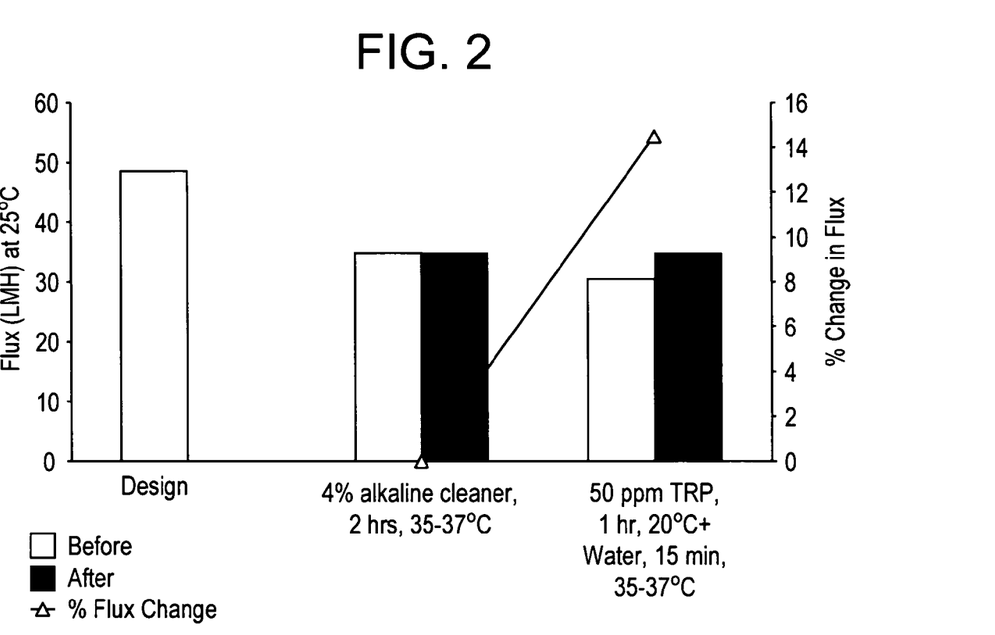
FIG. 2 shows the flux change obtained after cleaning with alkaline cleaner and with 50 ppm TRP below LCST followed by warm (above LCST) water rinse.

FIG. 2 shows the flux change obtained after cleaning with alkaline cleaner and with 50 ppm TRP at a temperature below LCST followed by warm (above LCST) water rinse Separate membrane coupons were used for different test sequences.

It is apparent from FIG. 2 that after cleaning with alkaline cleaner, NaCl solution flux did not improve. After cleaning with a 50 ppm TRP solution followed by a warm (above LCST) water rinse there was over a 14% increase in flux.

Figure 3:
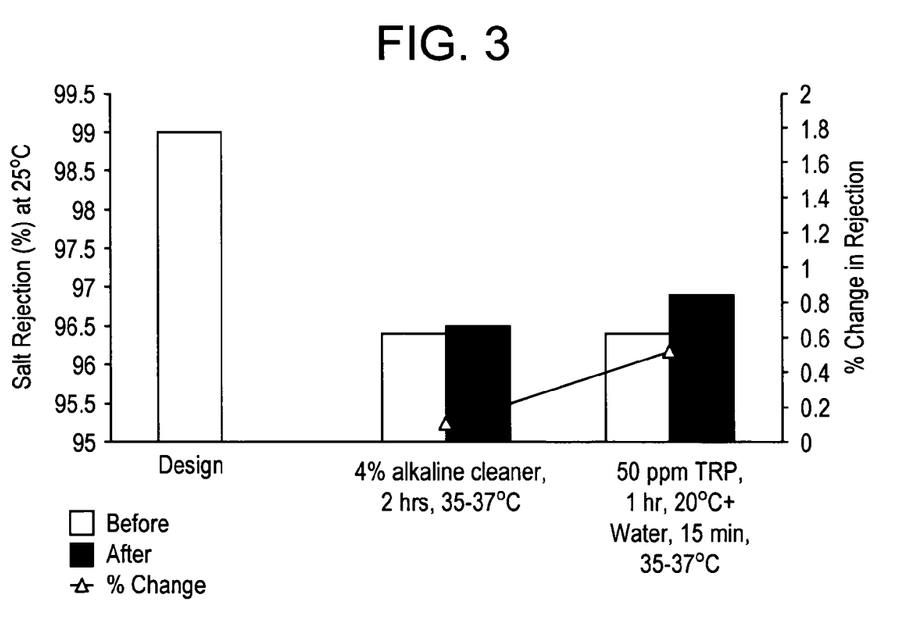
FIG. 3 shows the salt rejection change obtained after cleaning with alkaline cleaner and with 50 ppm TRP below LCST followed by warm (above LCST) water rinse.

As shown in FIG. 3, salt rejection increased from 96.4 to only 96.5 with alkaline cleaner, but with TRP followed by a warm (above LCST) water rinse improved the rejection to 96.9%.

Example 2

Figure 4:
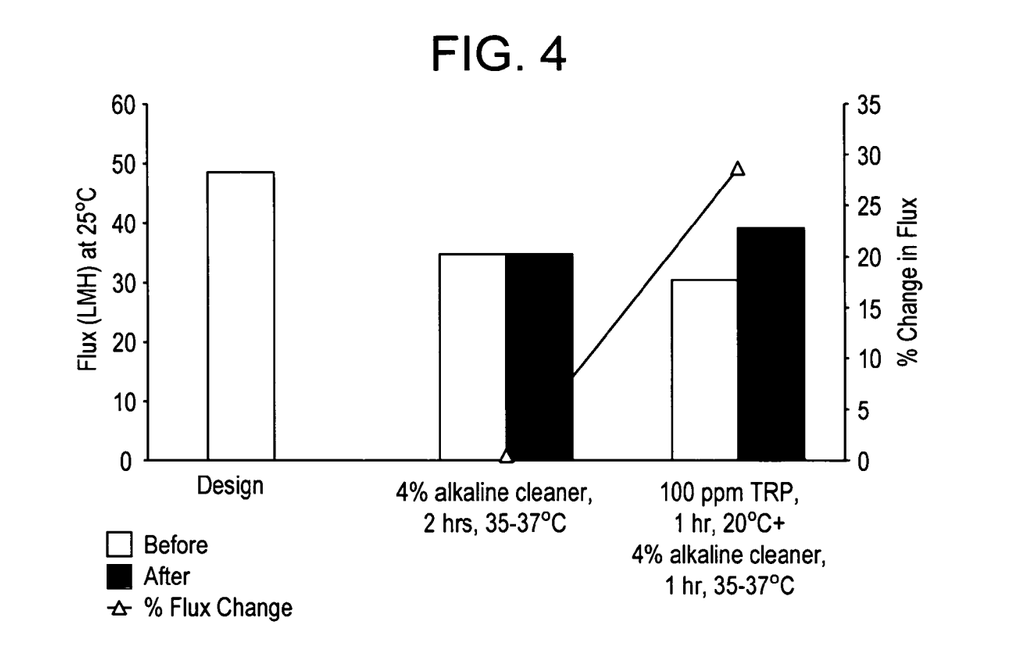
FIG. 4 shows the flux change obtained after cleaning with alkaline cleaner alone and with 100 ppm TRP below LCST followed by a warm (above LCST) alkaline cleaner.
Figure 5:
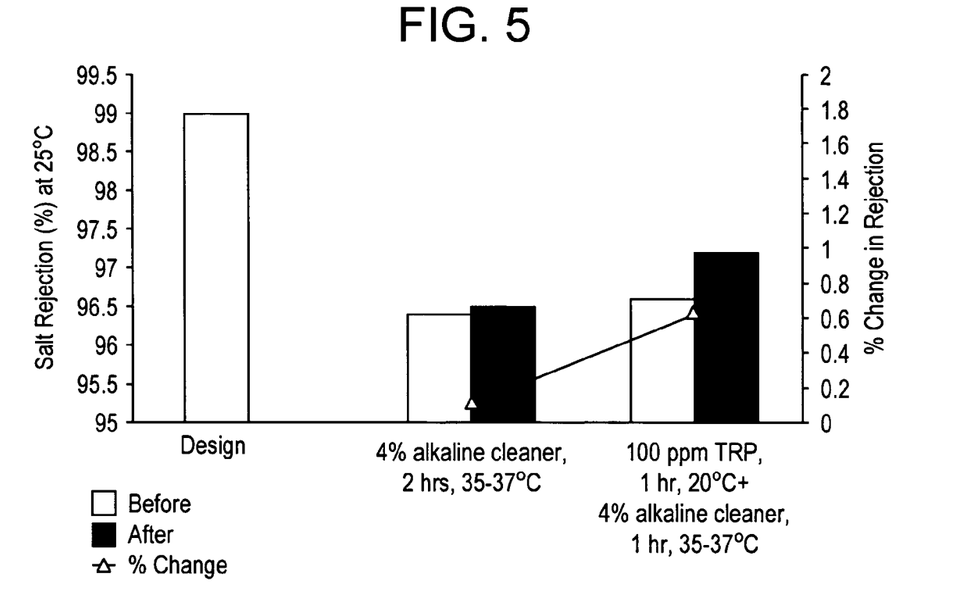
FIG. 5 shows the salt rejection change obtained after cleaning with alkaline cleaner alone and with 100 ppm TRP below LCST followed by a warm (above LCST) alkaline cleaner.

The protocol for Example 2 is the same as that of Example 1, except in this example, 100 ppm TRP was used instead of 50 ppm and instead of water, 4% warm (above LCST) alkaline cleaner was used after TRP solution treatment. The results are shown in FIG. 4. In this example, higher TRP dosage and alkaline cleaner resulted in about 29% increase in flux compared to no change with alkaline cleaner alone. FIG. 5 shows that salt rejection increased to 97.2% with 100 ppm TRP followed by warm (above LCST) alkaline cleaner.

SUMMARY OF EXAMPLES

Thus both examples demonstrate the benefit of the method of this invention in terms of both flux and salt rejection improvement, indicating better cleaning by the method of this invention compared to alkaline cleaning alone that is commonly used for cleaning biofouled membranes.

The invention claimed is:

1. A method of cleaning a fouled or a scaled RO or NF membrane surface in a membrane separation system comprising:

(a) treating the membrane surface in a membrane separation system with a solution containing one or more thermo-responsive polymers (TRP), wherein said TRP is soluble in said solution and at least an effective amount of said TRP diffuses into a foulant layer on said membrane surface, wherein said TRP is a co-polymer of one or more monomers having formula $-CH_2=CR_1-CONR_2R_3$, wherein $R_1=H$ or $C_1-C_4$ alkyl group and $R_2$ and $R_3=H$, $C_1-C_{18}$ linear, branched or cyclic alkyl group and wherein $R_2$ and $R_3$ can not be both H, with one or more co-monomers selected from vinyl pyrrolidone, acrylic acid (AA), methacrylic acid (MAA), itaconic acid, styrene sulfonic acid, vinyl sulfonic acid, isopropenyl phosphonic acid, vinyl phosphonic acid, vinylidene diphosphonic acid, hydroxyethyl methacrylate (HEMA), dimethylaminoethyl acrylate (DMAEA), dimethylaminoethylmethacrylate (DMAEM), glycidyl acrylate, glycidyl methacrylate, acrylylglycinamide, N-acryloylsuccinimide (NASI), 2-acrylamido 2-methylpropane sulfonic acid (AMPS), N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulfopropyl)-ammonium betaine, N,N-dimethyl-N-methacrylamidopropyl-N-(3-sulfopropyl)-ammonium betaine (DMMAPSB), N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl) dimethylammonio]ethyl 2-methyl phosphate, 2-(acryloyloxyethyl)-2'-(trimethylammonium)ethyl phosphate, [(2-acryloylethyl) dimethylammonio]methyl phosphonic acid, 2-methacryloyloxyethyl phosphorylcholine (MPC), 2-[(3-acrylamidopropyl)dimethylammonio]ethyl 2'-isopropyl phosphate (AAPI), 1-vinyl-3-(3-sulfopropyl)imidazolium hydroxide, (2-acryloxyethyl) carboxymethyl methylsulfonium chloride, 1-(3-sulfopropyl)-2-vinylpyridinium betaine, N-(4-sulfobutyl)-N-methyl-N, N-diallylamine ammonium betaine (MDABS), N,N-diallyl-N-methyl-N-(2-sulfoethyl) ammonium betaine, or wherein said TRP is a homopolymer of a monomer having a formula $-CH_2=CR_1$-(2-acryloxyethyl) carboxymethyl methylsulfonium chloride, 1-(3-sulfopropyl)-2-vinylpyridinium betaine, N-(4-sulfobutyl)-N-methyl-N, N-diallylamine ammonium betaine (MDABS), N,N-diallyl-N-methyl-N-(2-sulfoethyl) ammonium betaine, or wherein said TRP is a homopolymer of a monomer having a formula $-CH_2=CR_1-CONR_2R_3$, wherein $R_1=H$ or $C_1-C_4$ alkyl group and $R_2$ and $R_3=H$, $C_1-C_{18}$ linear, branched or cyclic alkyl group, or their conjugates with proteins or enzymes, wherein $R_2$ and $R_3$ can not be both H or wherein said TRP is a co-polymer of one or more co-monomers having the formula $-CH_2=CR_1-CONR_2R_3$, wherein $R_1=H$ or $C_1-C_4$ alkyl group and $R_2$ and $R_3=H$, $C_1-C_{18}$ linear, branched or cyclic alkyl group or fluorescent moiety comprising pyrenyl, fluorenyl, naphthyl or dansyl, or a combination thereof, or their conjugates with proteins or enzymes, wherein $R_2$ and $R_3$ can not be both H;

(b) making insoluble said TRP diffused into said foulant layer by one or more of: raising the temperature of said solution above the lower critical solution temperature (LCST) of said TRP and adding a subsequent solution that is at a temperature above the LCST of said TRP; and (c) optionally, rinsing the membrane.

2. The method of claim 1, wherein said membrane is treated with a solution containing TRP by circulating said solution in said membrane separation system.

3. The method of claim 1, wherein said membrane is treated with a solution containing TRP by soaking said membrane separation system with said solution.

4. The method of claim 1, wherein said TRP is made insoluble by raising the temperature of said solution above the lower critical solution temperature (LCST) of said TRP.

5. The method of claim 4, wherein a cleaner is added to said solution.

6. The method of claim 1, wherein said TRP is made insoluble by adding a subsequent solution that is at a temperature above the LCST of said TRP.

7. The method of claim 6, wherein said subsequent solution contains a cleaner.

8. The method of claim 7, wherein said cleaner contains chlorine dioxide, chlorous acid, chloramines, sodium hypochlorite, bromine, bromous acid, sodium bromate, an oxyhalogen compound, or a combination thereof.

9. The method of claim 7, wherein said cleaner contains hydrogen peroxide, peracetic acid, sodium percarbonate, or a combination thereof.

10. The method of claim 7, wherein said cleaner contains one or more anionic surfactants; cationic surfactants; zwitterionic surfactants; non-ionic surfactants; or a combination thereof.

11. The method of claim 10, wherein said anionic surfactants are selected from the group consisting of; aliphatic organic phosphate esters; linear and branched alkylaryl sulfonates and derivatives thereof linear and branched alkylaryl ether sulfonates and derivatives thereof alpha olefin sulfonate; ammonium alcohol ethoxylate sulfate; ammonium alkyl ether sulfates; ammonium alkyl sulfates; alkyl sulfates; alcohol amine alkyl sulfates; alkyl sulfosuccinate salts; alkyl sulfonates and salts thereof alkyl ether sulfonates and salts thereof fatty alcohol ether sulfates; sulfates of alcohol; sulfonates of petroleum and petroleum derivatives; sulfonated oils and fatty acids; and a combination thereof.

12. The method of claim 10, wherein said nonionic surfactants are selected from the group consisting of: alkanolamides; alkanol amide alkoxylates; alkoxylated alkyl amines; alkoxylated alcohols; alkyl glucosides; alkyl phenol alkoxylates; alkyl phenol alkoxylated alcohols; alkylated fatty acids; alkoxylated fatty alcohols; linear fatty alcohols, C16-C18linear fatty acids; alkoxylated alkylphenols; alkoxylated triglycerides;
alkoxylated fatty acids; fatty acid amines; alkoxylated fatty esters and oils; polyol esters;
polyoxyalkylene esters of fatty acids; alkyl polysaccharide ethers; aliphatic ethers; polyether glycols;
sorbitan derivatives; block copolymers of propylene oxide and ethylene oxide; and a combination thereof.

13. The method of claim 10, wherein said cationic surfactants are selected from the group consisting of: single or mixed alkyl substituted ammonium chlorides, single or mixed alkyl substituted ammonium acetates, single or mixed alkenyl substituted ammonium chlorides and acetates, mixed alkyl hydroxyalkyl amidoalkyl substituted ammonium chlorides and acetates, single and mixed alkyl imidazolium salts, and a combination thereof.

14. The method of claim 10, wherein said zwitterionic surfactants are selected from the group consisting of: alkyl ammonium carboxylates; alkyl ammonium sulphates;
alkylammonium sulfonates; alkyl amine oxides; alkyl betaines; alkyl sulfobetaines; and a combination thereof.

15. The method of claim 7, wherein said cleaner contains one or more chelants and/or sequestering agents.

16. The method of claim 7, wherein said cleaner contains one or more enzymes.

17. The method of claim 16, wherein said enzymes are selected from one or more of the following enzymes: lipases; proteases; amylases; pectinases, cellulases, gluconases, galactosidases.

18. The method of claim 7, wherein said cleaner contains hydrochloric acid, nitric acid, citric acid, oxalic acid, phosphoric acid, sulphuric acid, or a combination thereof.

19. The method of claim 7, wherein the said cleaner contains sodium hydroxide, potassium hydroxide, calcium hydroxide, ammonium hydroxide or a combination thereof.

20. The method of claim 7, wherein the said cleaner is circulated in said membrane system that contains said membrane, soaked in said membrane system that contains said membrane, or a combination thereof.

21. The method of claim 7, wherein said subsequent solution is circulated in said membrane separation system for about 10 minutes to about 8 hours.

22. The method of claim 21, wherein said subsequent solution is circulated in said membrane separation system for about 10 minutes to about 120 minutes.

23. The method of claim 1, wherein said solution contains a cleaner.

24. The method of claim 1, wherein the molecular weight of said TRP is about 1,000 to about 20MM daltons.

25. The method of claim 1, wherein said membrane is rinsed with a solution that contains water.

26. The method of claim 25, wherein said solution is at a temperature below the LCST of said TRP.

27. The method of claim 1, wherein the dosage of TRP is from about 1 ppm to about 5000 ppm of active solids of TRP.

28. The method of claim 1, wherein the molecular weight of said TRP is about 1000 to about 100,000 daltons.

29. The method of claim 1, wherein said membrane is treated with said solution containing TRP for about 10 minutes to about 8 hours.

30. The method of claim 1, wherein said membrane is treated with said solution containing TRP for about 10 minutes to about 120 minutes.

* * * * *